(12) United States Patent  
Blum

(10) Patent No.: US 7,989,114 B2
(45) Date of Patent: Aug. 2, 2011

(54) FUEL-CELL COMPRISING CAPILLARIES

(75) Inventor: Stephan Rüdiger Blum, Calgary (CA)

(73) Assignee: White Fox Technologies Limited, London (GB)

( * ) Notice: Subject to any disclaimer, the term of this patent is extended or adjusted under 35 U.S.C. 154(b) by 1024 days.

(21) Appl. No.: 10/591,209

(22) PCT Filed: Mar. 1, 2005

(86) PCT No.: PCT/DE2005/000350
§ 371 (c)(1),
(2), (4) Date: Jul. 11, 2007

(87) PCT Pub. No.: WO2005/086270
PCT Pub. Date: Sep. 15, 2005

(65) Prior Publication Data
US 2008/0096065 A1    Apr. 24, 2008

(51) Int. Cl.
H01M 8/04 (2006.01)
H01M 8/24 (2006.01)
H01M 4/86 (2006.01)
H01M 8/10 (2006.01)

(52) U.S. Cl. ........................ 429/466; 429/506
(58) Field of Classification Search .................. 429/466, 429/506
See application file for complete search history.

(56) References Cited

U.S. PATENT DOCUMENTS

2002/0197520 A1* 12/2002 Quick et al. .................... 429/32
2003/0021890 A1   1/2003 Marsacq et al.
2003/0059665 A1   3/2003 Blum et al.
2004/0197637 A1  10/2004 Blum
2006/0246337 A1* 11/2006 Sarkar et al. .................... 429/34

FOREIGN PATENT DOCUMENTS

| CA | 2 364 447 | 9/2000 |
| DE | 195 17 425 | 10/1996 |
| DE | 199 09 930 | 9/2000 |
| DE | 199 51 687 | 5/2001 |
| WO | WO 97/47052 | 12/1997 |
| WO | WO 00/54358 | 9/2000 |
| WO | WO 02/09212 | 1/2002 |
| WO | WO 02/15318 | 2/2002 |
| WO | WO 03/005466 | 1/2003 |

OTHER PUBLICATIONS

Search Report dated Jul. 26, 2005 for the underlying International Application No. PCT/DE2005/000350.

* cited by examiner

*Primary Examiner* — Gregg Cantelmo
(74) *Attorney, Agent, or Firm* — Cohen Pontani Lieberman & Pavane LLP

(57) ABSTRACT

A fuel cell comprising a reaction chamber; a plurality of capillary tubes configured to permit a fuel component to flow there through, the capillary tubes being arranged in bundles in adjacent segments within the reaction chamber; a plurality of electrodes, at least one of the plurality of electrodes passing through each of the plurality of capillary tubes, being against each of the plurality of capillary tubes, or passing through and being against each of the plurality of capillary tubes; and a plurality of counter-electrodes, Each electrode extends beyond ends of its respective capillary tube, and electrodes associated with capillary tubes of a segment are electrically connected to one another at each end at substantially the same electrical potential. Each segment has a wall section to which is attached at least one of the counter-electrodes or wherein the wall section at least partially forms at least one of the counter-electrodes.

34 Claims, 10 Drawing Sheets

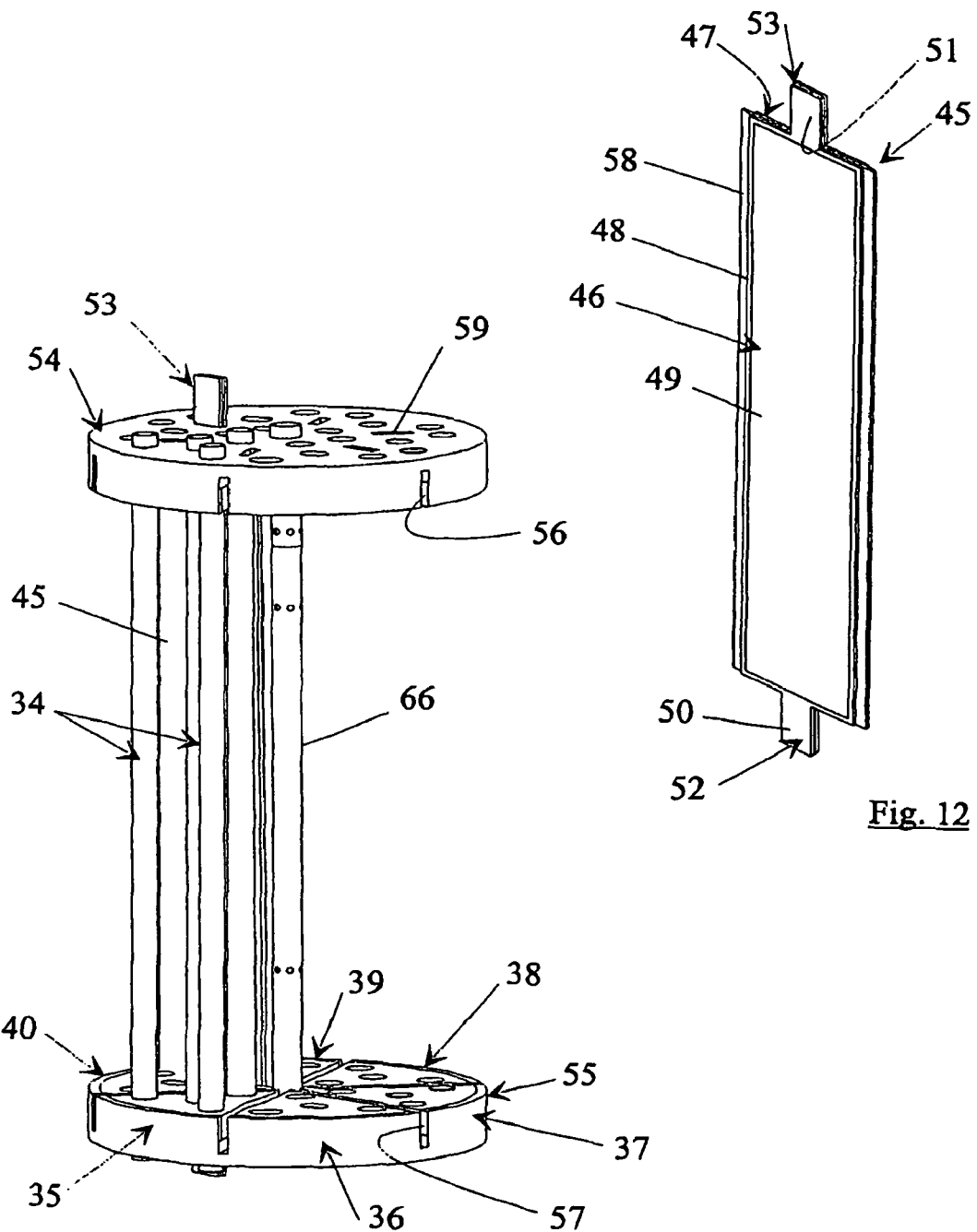

FUEL-CELL COMPRISING CAPILLARIES

CROSS-REFERENCE TO RELATED APPLICATIONS

This is a U.S. national stage of International Application No. PCT/DE2005/000350, filed on 1 Mar. 2005. Priority is claimed on German Application No. 10 2004 010 995.8, filed on 3 Mar. 2004.

BACKGROUND OF THE INVENTION

1. Field of the Invention

The invention concerns a fuel cell, especially a direct methanol fuel cell.

2. Description of the Related Art

It is known that the output of fuel cells can be increased by connecting their power-generating microreactors in parallel or in series. For example, WO 00/54358 explains the structure of fuel cell modules in which many individual microreactors are arranged in each plane of a frame and are connected in series. The surfaces of the individual electrodes are formed as cathodes and are in direct contact with each other, and the coaxially inner anodes of the individual microreactors are connected with each other at an end face of the module.

Individual modules of this type can in turn be cascade-connected and/or series-connected.

WO 03/005466 discloses another output-enhancing arrangement of bundles of microreactors, likewise with a coaxial structure. Alternatively, it is explained that the microreactors can be replaced by microreactors with a common outer electrode, so that the basic coaxial structure is preserved.

Due to the coaxial design of these microreactors, the built-up electric potential is generally tapped at the axial end of such a microreactor. The length of the microreactor thus also determines the electric power output.

Especially if so-called tubular assemblies are used as microreactors, the mechanical stability is usually low, and for this reason the length of this type of microreactor is limited, and the power output or the level of voltage that can be tapped is correspondingly low.

SUMMARY OF THE INVENTION

On the basis of this technical background, an object of the invention is to make available a fuel cell that guarantees a high power output and at the same time has a structurally simple design and low developmental costs.

This object is achieved with a fuel cell of the invention. The fuel cell is provided with a plurality of capillary tubes, each of which has an electrode. A fuel component flows through and/or against each capillary tube. The fuel cell of the invention is characterized by the fact that the capillary tubes are arranged in bundles in adjacent segments, with each bundle being located within a reaction chamber, that the electrode is led out at both ends of each capillary tube, that the electrodes of the capillary tubes of a segment are electrically connected at both ends at essentially the same potential, and that at least one wall section of each segment is provided with a counter-electrode or at least partially forms the counterelectrode.

The fuel cell of the invention has a number of advantages. First, the capacity of the fuel cell is determined by the number of segments, which generally have the same design and can be series-produced. In this connection, it is of great importance that the coaxial construction of the previously known microreactors is abandoned, so that the length of the capillary tubes is no longer crucial for the potential between the first and second electrode, but rather each capillary tube has only one electrode, which is parallel-connected at both ends with the corresponding electrodes of the other capillary tubes of a segment. At the end of the capillary tubes, essentially the same electric potentials are present at the electrodes counter to a counterelectrode. The counterelectrode is formed on or by a wall section of each segment, and its form can, for the most part, be freely designed.

The segments can have any desired cross sections, for example, rectangular or triangular. The segments preferably have cross sections that are circular sectors. This results in an extremely compact construction, especially within a cylindrical housing.

For a voltage increase relative to the voltage delivered by one segment, it can be provided that the electrodes of the capillary tubes of a segment are connected counter to the counterelectrode of an adjacent segment, which corresponds to a series connection.

For a power increase, it can be alternatively provided that the electrodes of all capillary tubes of a fuel cell are connected together at the ends, which corresponds to a parallel connection.

It is advantageous to be able to preset the connection—parallel or in series—by a switch, especially an electronic switch. The application possibilities of the fuel cell of the invention can be considerably enhanced by this measure.

In a design modification, each segment has its own walls, which run in a closed ring (in cross section), enclose the electrodes, and thus form two spaced separating walls between two adjacent segments. These walls, which are electrically conductive, can also serve as counterelectrodes. In addition, due to the spacing, electrical insulation is usually not necessary. However, the formation of two spaced separating walls between two adjacent sectors can also be advantageous whenever an inactive zone of an electrolyte is to be created between these separating walls. Separating walls of this type, which are preferably nonconductive, then usually have a separately formed counterelectrode.

Alternatively, there is the possibility that adjacent segments have a common separating wall. In this case, the core of the wall generally consists of an electrically insulating material.

Another advantage is that separating walls can be constructed without a tight seal. Separating walls can even be provided with openings, which, especially in the case of the construction of two separating walls, correspond to each other and lie directly opposite each other. In particular, expensive sealing measures are also avoided in this way in the case of common separating walls, and the exchange of an electrolyte or the like between the segments is also possible.

In the fuel cell of the invention, it is also preferred for a common separating wall of two adjacent segments to have a counterelectrode on both sides, each one assigned to one of the segments. Therefore, each segment with a circular annular cross section has two obliquely opposite counterelectrodes.

In a design modification, a counterelectrode of this type has a support sheet that is covered with a lattice-like mount for a catalyst. A lattice-like mount of this type can be an expanded metal mesh, a metal mesh, a metal wire cloth, or a comparably porous material, on or in which a catalyst of crystalline structure is readily supported.

In a comparable manner, the capillary tube preferably has a lattice-like core, which is covered with a catalyst and is annularly surrounded by a membrane. However, a wide variety of capillary tubes is possible, and such variants are described, for example, in WO 02/15318.

In particular, the core, the support sheet, and/or the lattice-like mount are made of titanium.

In one embodiment of the fuel cell, it is provided that the capillary tubes are open at the ends and a gas has free access to flow through them. In other words, at both ends of the reactions chambers of the segments, the ends of the capillary tubes pass through bounding housing walls, cover plates, or the like and remain open in front of these structures.

In another preferred embodiment of the fuel cell, it is then provided that air flows through the capillary tubes and that a pressure chamber is formed by a housing at one end of the capillary tubes, which terminate with their open ends in the pressure chamber, into which atmospheric air is admitted by means of a ventilator. Although in principle a gaseous fuel component can be forced through the capillary tubes under high pressure, a pressurized fuel component is not universally available. With respect to use that is as unrestricted as possible and with respect to low costs, the low pressure difference that is developed by the ventilator is sufficient in the fuel cell of the invention to convey air through the capillary tubes in an advantageous way.

In a further modification of the fuel cell, it is provided that a common, closed-end feed line for a fuel component is provided between adjacent edges or tips of segments and that the feed line is provided with openings through which the fuel component can enter the reaction chambers of the segments. Several or even all of the reaction chambers of a fuel cell are centrally supplied with a fuel component by the feed line, and the supply line at least partly bounds a reaction chamber and especially at least partly forms the edges or tips of the reaction chamber.

An exhaust gas line is similarly constructed. In the reaction chambers of the segments, the exhaust gas line is provided with openings that admit a gaseous combustion product. The exhaust gas line opens outside the fuel cell. It is advantageous for the exhaust gas line also to be centrally constructed and, especially, to be formed as a continuation of the feed line. Naturally, however, the two lines can be sealed away from each other.

To ensure that the fuel component also enters the reaction chambers, it can be provided that at least one pump is connected to the feed line and that the pump is installed in a pump chamber of a housing at the opposite end of the fuel cell from the pressure chamber. Therefore, the reaction chambers are located between the pressure chamber and the pump chamber. The pressure buildup by the pump inside the feed line should be sufficient to ensure that the fuel component flows into the reaction chambers. It is advantageous to install this pump in a pump chamber of a housing at the opposite end of the fuel cell from the pressure chamber. As a result, the fuel cell of the invention has an extremely compact, longitudinally oriented type of construction.

If the fuel component introduced into the reaction chambers by the feed line is a fuel mixture, individual components of the fuel mixture can each be fed into the feed line by an automatically controlled pump. In this case, a control system automatically controls the pumps to provide optimum adjustment of the proportions of the individual components in the fuel mixture. In this regard, especially a fuel mixture of methanol and water is proposed, and the fuel cell of the invention is preferably operated as a direct methanol fuel cell.

To achieve a design of a fuel cell that can be inexpensively built and operated, it is advantageous to construct the fuel cell for operation with vertically rising capillary tubes and with a pressure chamber at the top. As a result of this measure, the fuel cell of the invention is constructed largely as an open system, and therefore many pressure-tight connections can be dispensed with. In particular, when the fuel cell is operated in this way, gravity makes it possible for a liquid phase emerging from the capillary tubes, for example, condensation water or the like or possibly a combustion product as well, to be collected in a collecting chamber at the lower end and removed or fed back to the combustion process after it has been treated.

In a specific embodiment as a direct methanol fuel cell, the reaction chambers are filled with acidic methanol. In this case, however, a free space is left above the liquid level of the acidic methanol. A gaseous combustion product, e.g., $CO_2$, can collect in this free space and can then be discharged to the outside through the exhaust gas line. Accordingly, the level of filling of the reaction chambers is monitored with level sensors, so that a filling level that is too high or too low can be reliably detected, in which case the combustion process of the fuel cell is stopped.

In a further design modification of the fuel cell, it is provided that the segments are arranged inside a cylindrical housing and that the housing is sealed at the axial ends by cover plates through which the capillary tubes pass. In particular, it is possible for the electrodes of the capillary tubes also to be electrically connected through the cover plates. As an advantageous measure, it can be further provided that the cover plates grip the arrangement of the separating walls of the sectors and are likewise provided with separating webs. A panel that encloses the capillary tubes of the sector below it is mounted between the separating webs. The panel can also hold separately formed walls of the sectors, e.g., against the separating webs, and the electrical connections of the counterelectrodes are led out of the sectors, preferably through the cover plates, and are likewise connected above the cover plates.

To secure the separating walls between two sectors, the cover plates preferably have grooves for holding the separating walls. These grooves are located on the sides of the cover plates that axially terminate the reaction chambers. The separating walls can be securely held in this way without any significant design measures. As mentioned earlier, more extensive sealing measures are unnecessary.

To lead the electrical connections of the counterelectrodes out of the reaction chambers of the sectors, it can be further provided that both ends of the separating wall have a projecting connector, which is provided with an extension of the support sheet. The connectors pass through both of the cover plates that close the housing at the axial ends.

In a design modification, the housing is provided with flanges for attaching the pressure chamber housing and the chambers at the opposite end of the fuel cell. The pressure chamber can be sealed from the environment in a simple way by a pressure chamber housing with a cap-like design. With a suitable design of the flange connections, additional chambers in the required number can be installed at the opposite end, and, if necessary, other fuel cells of the invention can also be attached.

BRIEF DESCRIPTION OF THE DRAWINGS

The invention is explained in greater detail below with reference to the figures, which show merely schematic drawings of specific embodiments of the invention.

FIG. 11 shows a simplified isometric drawing of the mounting of capillary tubes.

FIG. 12 shows a common separating wall of two sectors.

FIG. 13 shows an isometric drawing of a housing that holds a sector in a view towards a cover plate.

DETAILED DESCRIPTION OF THE PRESENTLY PREFERRED EMBODIMENTS

Figure 1:
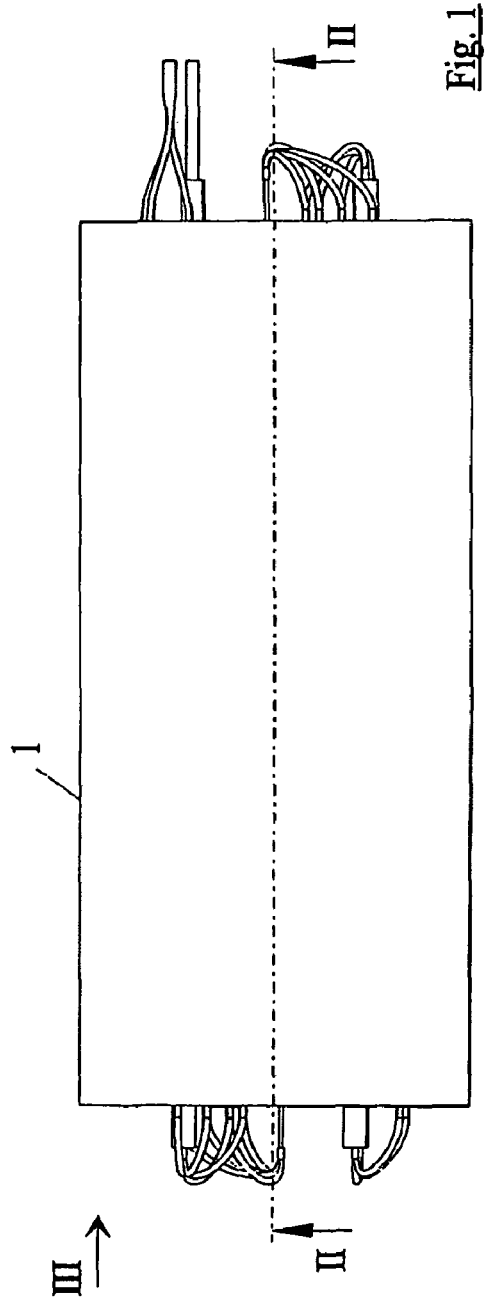
FIG. 1 shows a first view of sectors.
Figure 2:
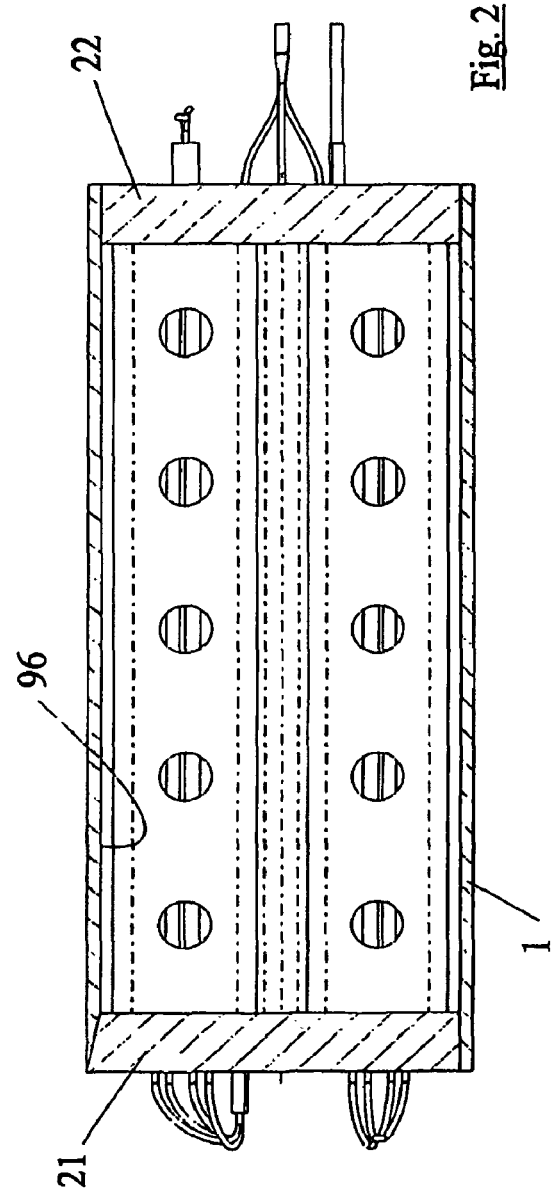
FIG. 2 shows a section along line II-II in FIG. 1.
Figure 3:
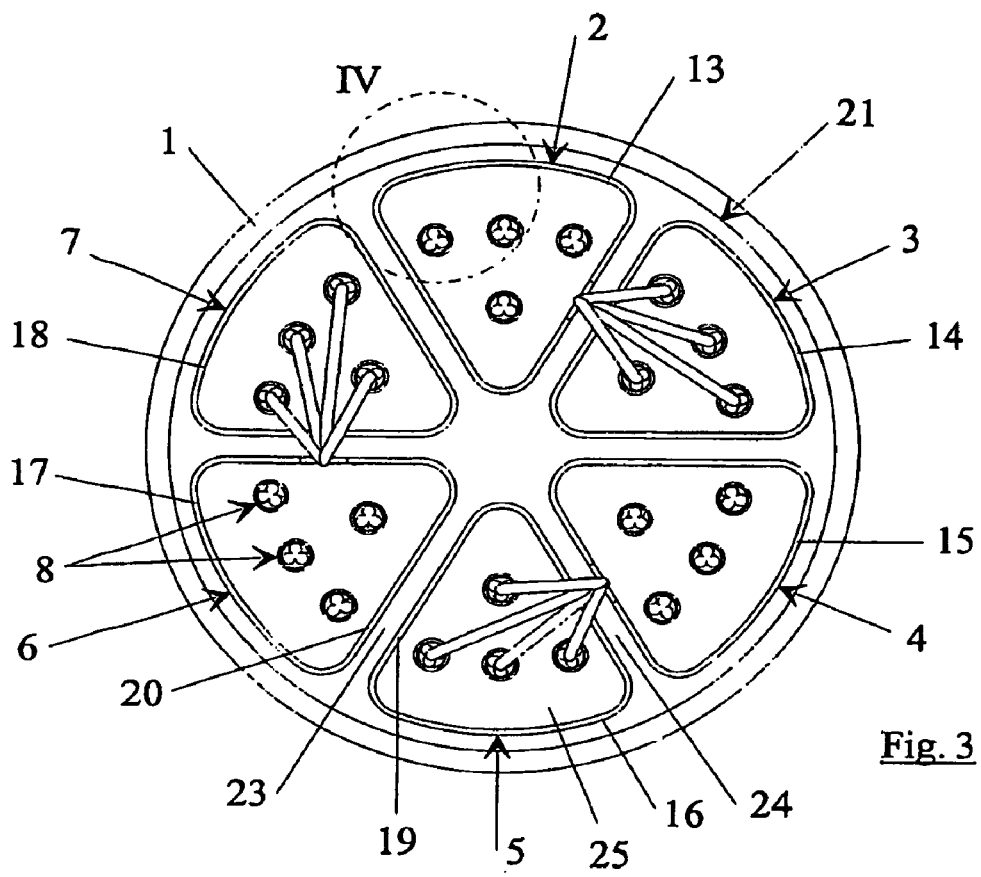
FIG. 3 shows the view indicated by the arrow III in FIG. 1.

FIG. 1 shows a cylindrical housing 1, in which six similarly adjacent segments 2-7 are provided with a plurality of capillary tubes 8, through and/or against which a fuel component flows and which are arranged in bundles (see FIG. 3).

Figure 4:
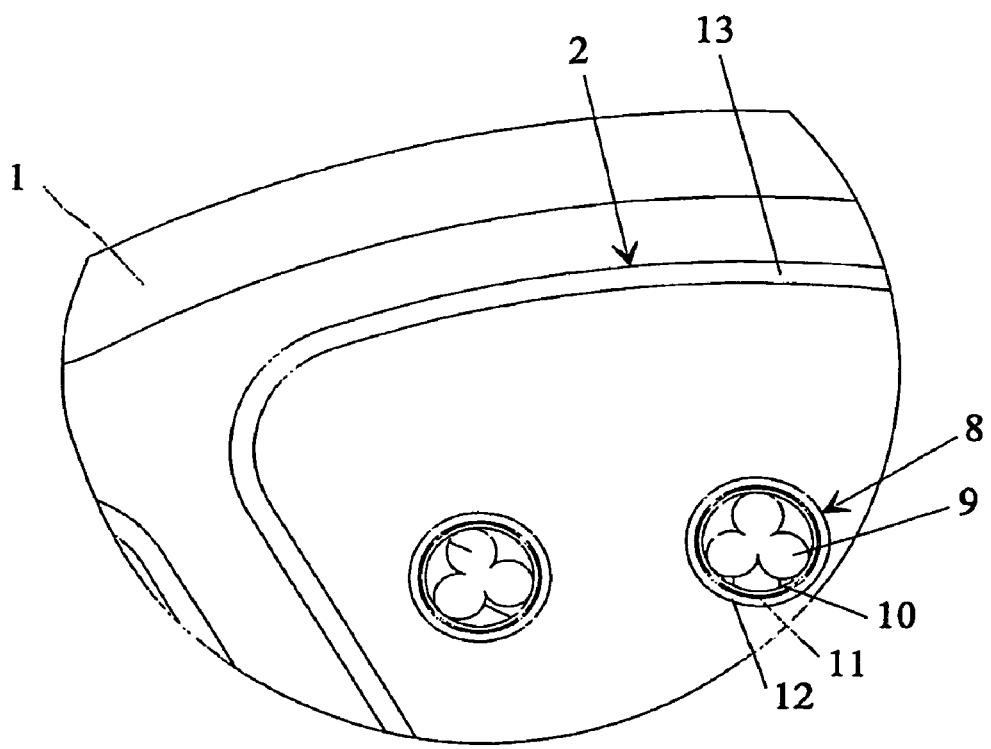
FIG. 4 shows a detail view of section IV in FIG. 3.

As shown in FIG. 4 in the present case, the capillary tubes 8 have a radially inner cloverleaf profile 9, which is surrounded by a lattice-like structure as the electrode 10, which in turn is provided with a radially external catalyst 11. A radially external membrane 12 surrounds the structure of the capillary tube 8. Since the profile 9 consists of an electrically conductive material that supports the capillary tube 8, and this material is especially a metal, preferably titanium, the electric potential on the lattice-like structure and on the profile 9 itself can be tapped as an electrode 10 led out at both ends.

The electrodes 10 and in this case the profiles 9 of each segment 2-7 as well are electrically connected in parallel and are also at essentially the same electric potential, as shown in FIG. 3 with the examples of segments 3, 5, and 7.

Figure 6:
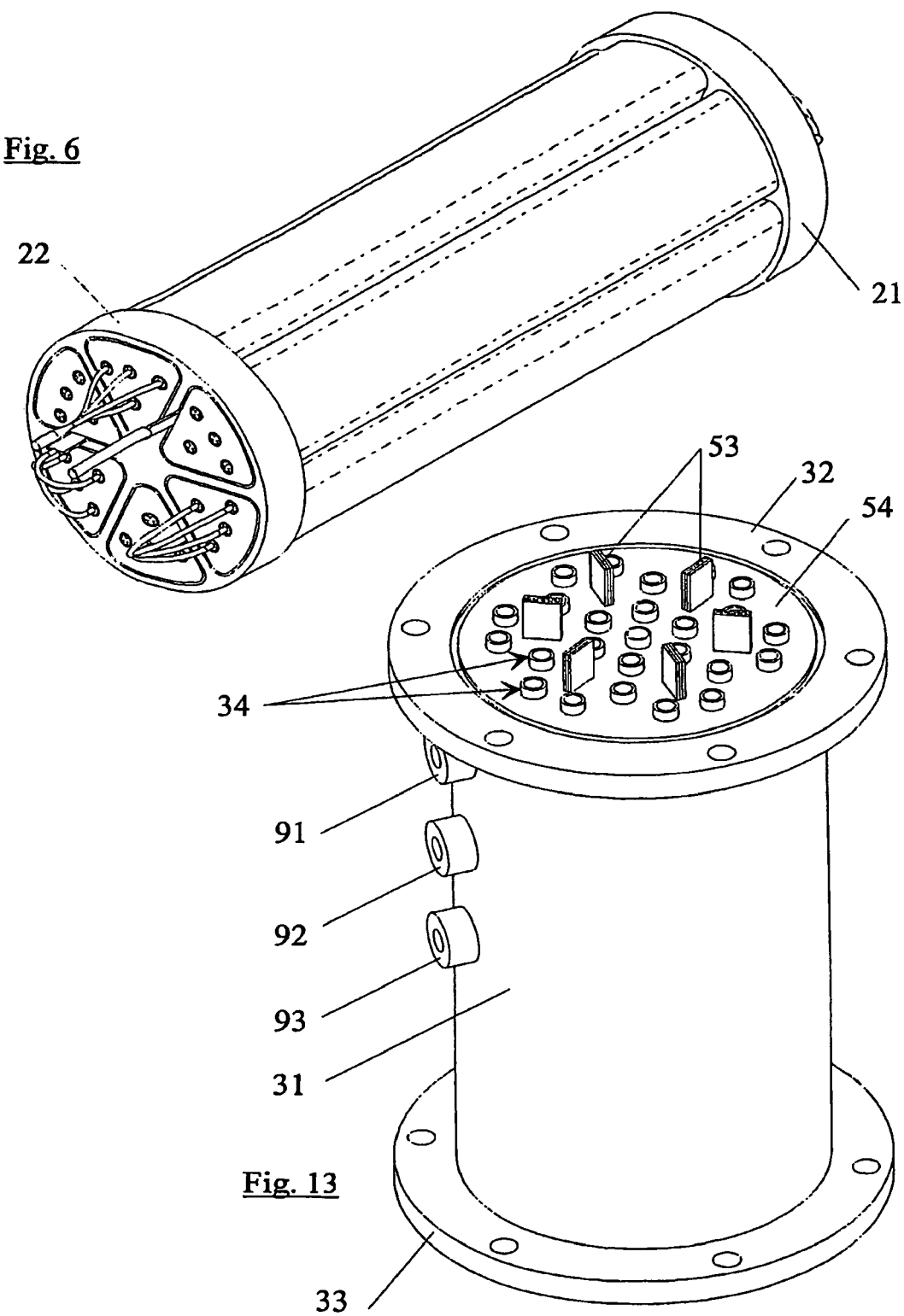
FIG. 6 shows an isometric drawing of the segments.

In the first embodiment, each segment 2 to 7 has its own walls 13 to 18, which in the view according to FIG. 3 run annularly around the capillary tubes 8 of each segment 2-7, so that two spaced separating walls, for example, 19, 20, are formed between, for example, the segments 5 and 6 (see also FIG. 6).

The electrically conductive walls 13 to 18 themselves constitute the counterelectrodes, and the segments 3, 5, 7 in FIG. 3 display the connection of the parallel-connected electrodes 10 of the capillary tubes 8 of the segments 3, 5, 7 counter to the connecting strips of the walls 13, 15, 17 of the respective adjacent segments 2, 4, 6, which walls 13, 15, 17 are designed as counterelectrodes.

The housing 1 is sealed at both axial ends by cover plates 21, 22, which are penetrated by the capillary tubes 8, which terminate open and freely accessible. The cover plates 21, 22, which have the same design, grip the arrangement of separating walls 19, 20 between adjacent segments 5, 6 and are also provided with spoke-like separating webs 23, 24. Enclosed between the separating webs 23, 24 and an outer ring of the cover plate 21, the wall 16 passes through the cover plate 21 with an exact fit. A reaction chamber located below is axially sealed by a panel 25 that encloses and holds the capillary tubes 8.

Figure 5:
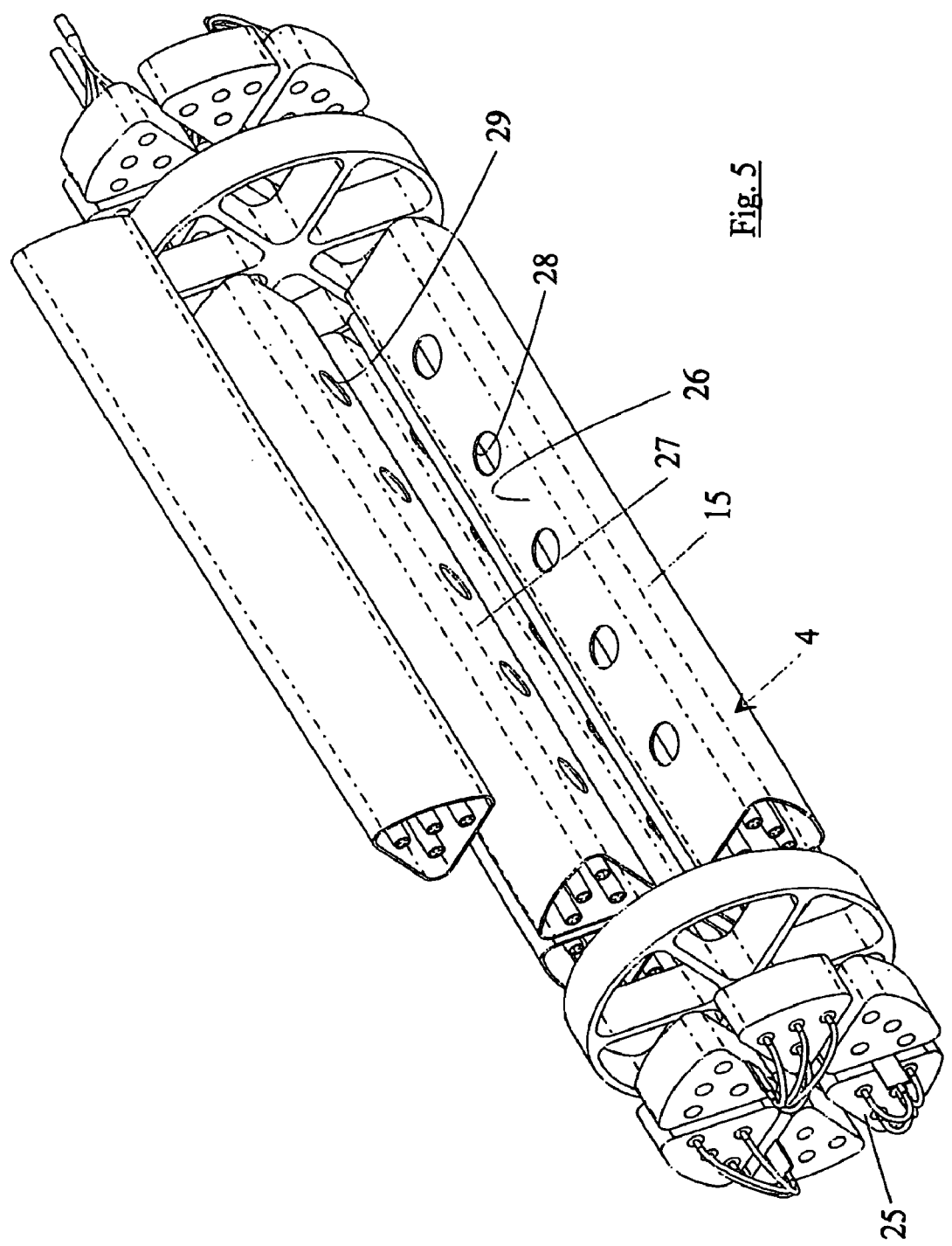
FIG. 5 shows an exploded view of the arrangement of the segments according to FIG. 1.

The walls 13-18 of the segments 2-7 are held apart from the inner wall 96 of the housing 1 by the cover plates 21, 22. In addition, the two separating walls 26, 27 and the other separating walls formed between the individual segments 2 to 7 (see FIG. 5) are provided with openings 28, 29, which preferably lie opposite each other, so that a flow exchange of an electrolyte inside the housing and the segments 2-7 is largely possible.

A preferred embodiment, which is designed here, by way of example, as a direct methanol fuel cell, is further explained with reference to FIGS. 7 to 13.

Figure 7:
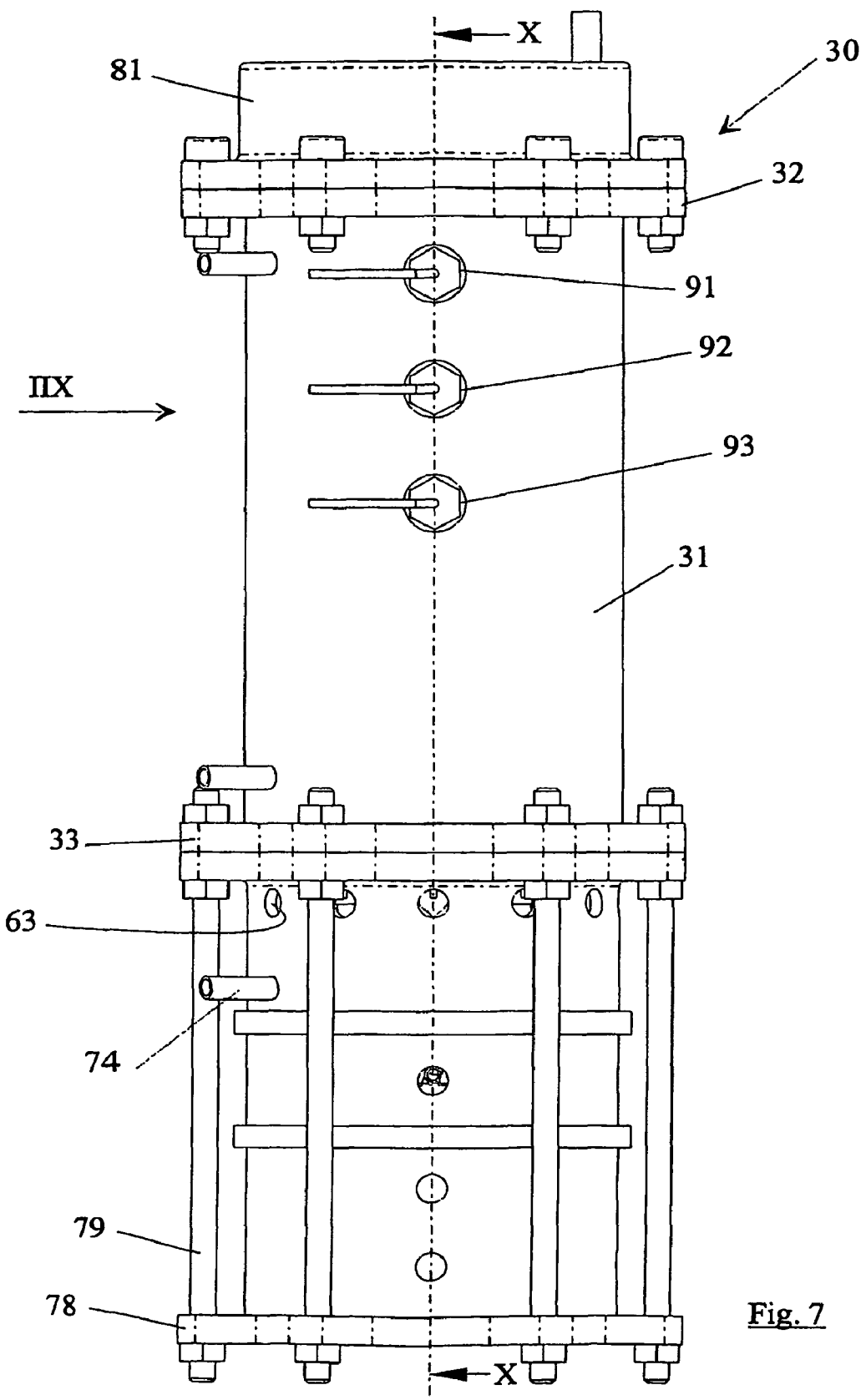
FIG. 7 shows a first external view of a second embodiment of a fuel cell of the invention.
Figure 8:
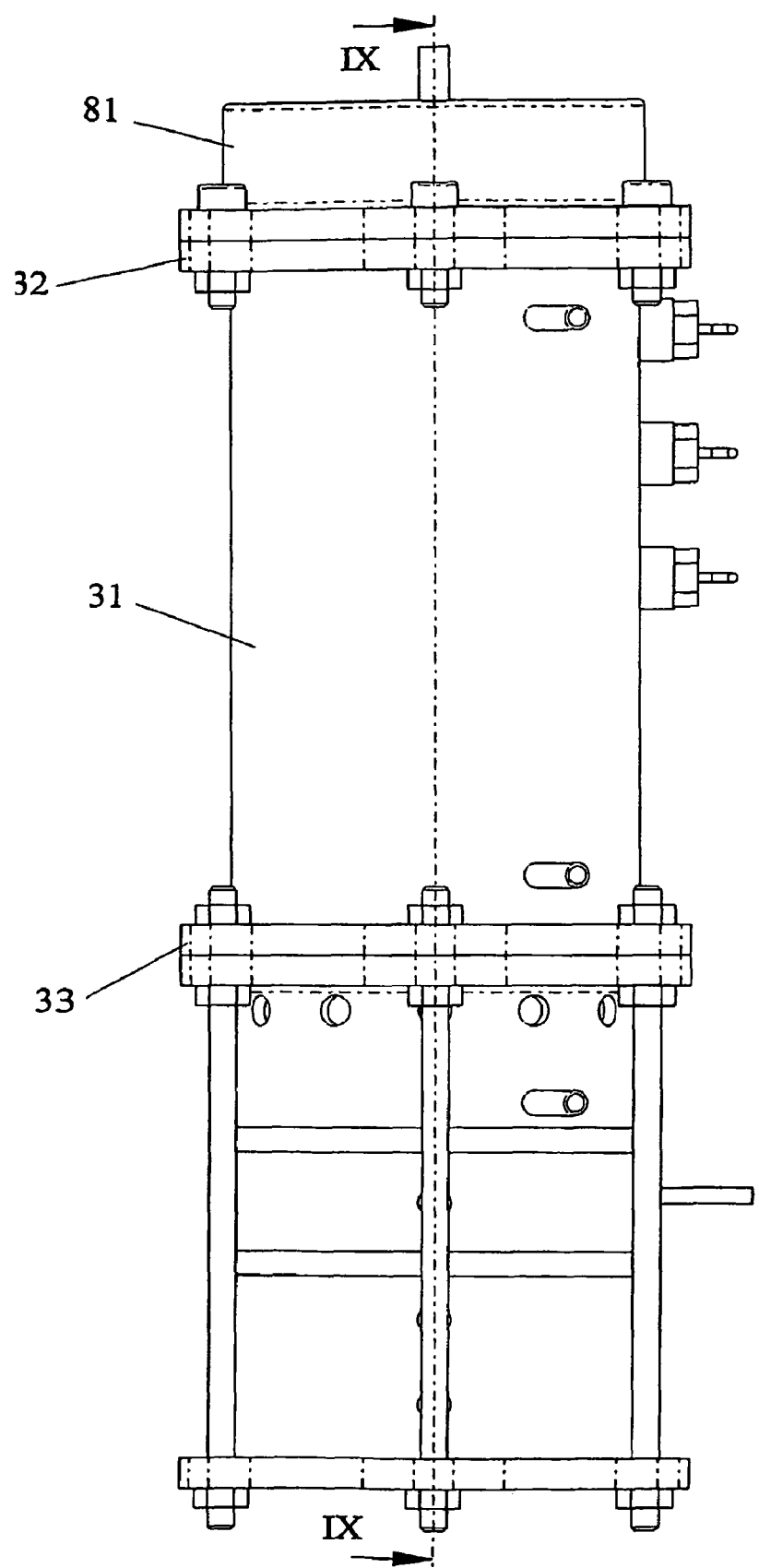
FIG. 8 shows the view indicated by arrow VII in FIG. 7.

The fuel cell 30 according to FIG. 7 is essentially cylindrical in shape. The reaction takes place inside a cylindrical housing 31 (see also FIG. 13), which is provided with flanges 32, 33 for additional attachments.

In the fuel cell 30, a plurality of capillary tubes 34 is again bundled in six segments 35 to 40 (see FIG. 11). The capillary tubes 34, which have the same design, have a coiled core as an electrode 41. However, a tubular electrode is preferred, whose surface has a lattice-like design, is covered with a catalyst, and consists of a titanium expanded metal mesh or titanium wire cloth. Finally, the electrode is annularly surrounded by a membrane 42. In the present specific embodiment of a direct methanol fuel cell, this electrode is a cathode.

In this embodiment, the cores of the capillary tubes 34, as electrodes 41, are electrically connected in parallel at both ends at essentially the same potential.

Alternatively, it can be provided that the electrodes 41 of a segment 35-40 are connected in parallel at both ends and in each case counter to the same counterelectrodes (the anodes in the method of operation described here) of adjacent segments.

In this regard, it has been found to be advantageous to provide a switch for the connection, especially an electric/electronic switch, with which the voltage or the power output can be freely varied by series connection or parallel connection.

The segments 35 to 40 are separated from each other in spoke-like fashion by common separating walls 43, 44 (see FIG. 9), and sealing measures are not necessary here.

The separating wall 45 illustrated in FIG. 12 is provided on both sides with identically designed counterelectrodes 46, 47 on an electrically nonconductive core 58. The counterelectrode 46 has a lattice-like mount 49 for a catalyst on a support sheet 48. This mount 49 consists especially of a titanium expanded metal mesh or titanium wire cloth.

As a result, each bundle of capillary tubes 34 of a segment 35-40 is enclosed by two obliquely opposite counterelectrodes.

For electrical connection of the counterelectrodes 46, 47, the separating walls 45 have opposite connectors 52, 53, which project axially and are provided at both ends with an extension 50, 51 of the support sheet 48. The separating walls 45, together with the capillary tubes 34, are held in cover plates 54, 55 and pass through them. Furthermore, the cover plates 54, 55 are provided with grooves 56, 57, which are arranged in spoke-like fashion, for holding the separating walls 45. The connectors 53 of the electrodes 46, 47 are led out through rectangular openings 59 (see FIG. 11).

Figure 9:
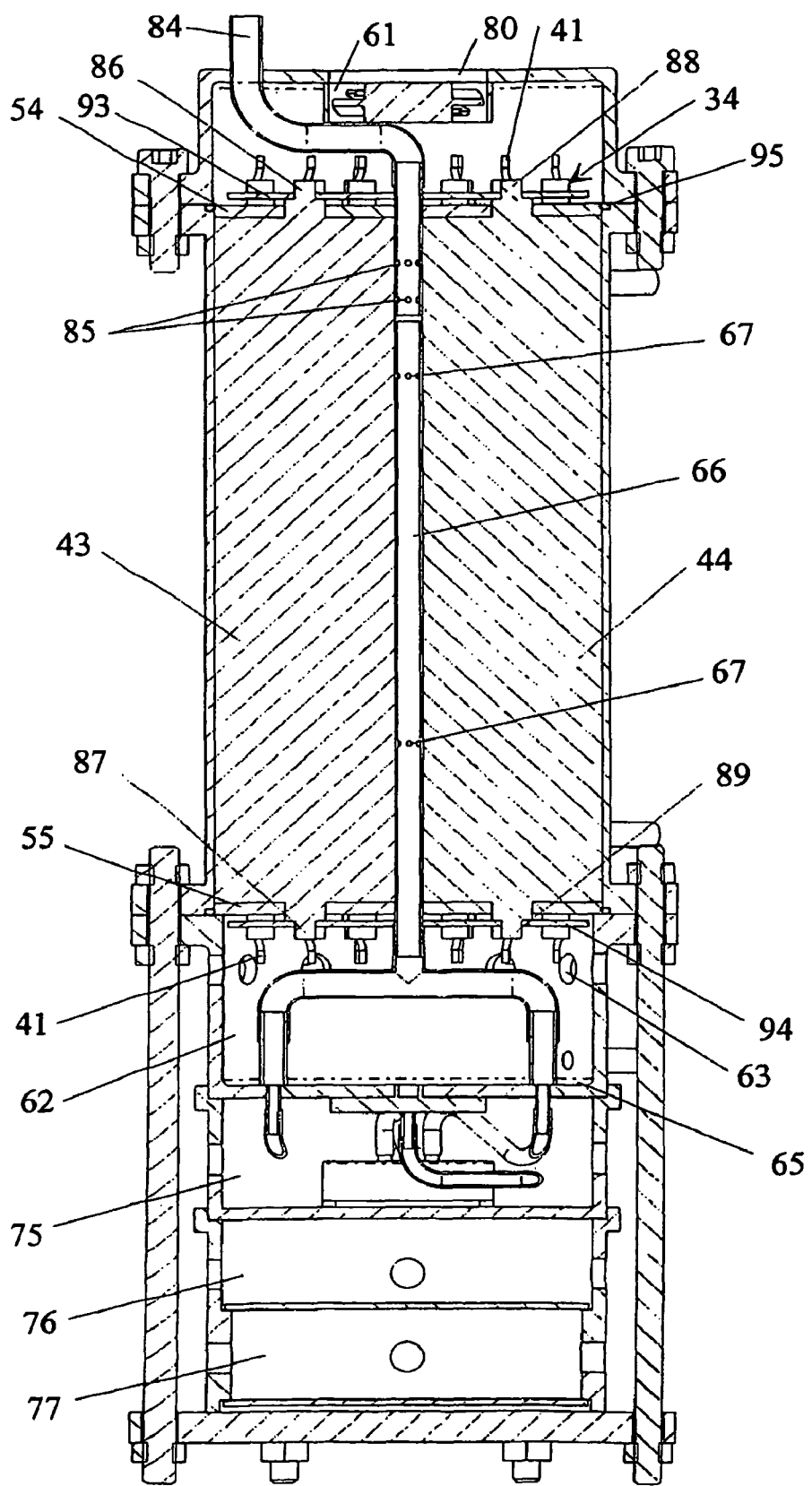
FIG. 9 shows a section along line IX-IX in FIG. 8.
Figure 10:
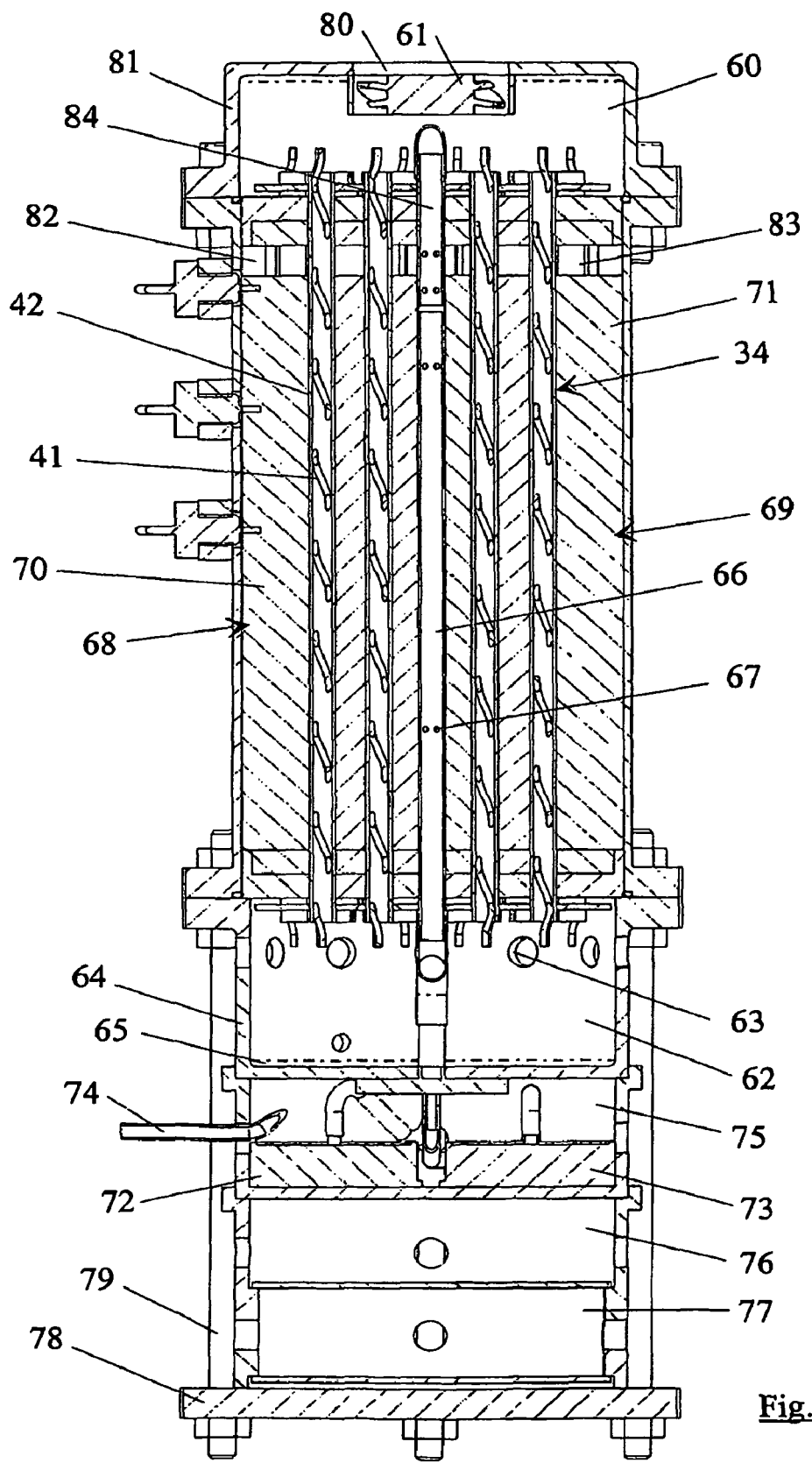
FIG. 10 shows a section along line X-X in FIG. 7.

The sections according to FIGS. 9 and 10 show that the capillary tubes 34 also pass through the cover plates 54, 55 and project from them and are open at their ends. The electrodes 41 and/or the connectors of the counterelectrodes are connected by means of head pieces 93, 94 designed as plates (see the connectors 86-89 of the separating walls 43, 44 according to the sectional drawing shown in FIG. 9).

A gas, in this case air, can flow through the capillary tubes 34, which are open at the ends. To guarantee that the gas can flow through reliably, a pressure chamber 60 is formed at the upper end of the capillary tubes. In the present embodiment, a ventilator 61 under an opening 80 in the pressure chamber housing 81 ensures that a positive pressure relative to ambient pressure (though only a slight positive pressure) prevails in the pressure chamber 60. However, this slight positive is sufficient to enable air to flow through the capillary tubes 34. After flowing through the capillary tubes 34, the air enters a chamber 62 and escapes to the outside through openings 63 in a housing 64. The pressure chamber housing 81 is shaped like a hat and secured against the upper flange 32 of the housing 31. Standard sealing measures in the form of an O ring 95 can also be provided.

The chamber 62 can also serve as a collecting chamber for a liquid phase 65 emerging from the capillary tubes 34, for example, condensation water in the present case, or for a possible combustion product in a fuel cell with a different configuration. If necessary, an additional collecting chamber can also be provided for this purpose beneath the chamber 62. The condensation water can be disposed of, or, alternatively, possibly after a treatment, fed back into the combustion circulation as a fuel component.

A fuel mixture consisting of water and methanol is used in the fuel cell 30. This fuel mixture is fed to the reaction chambers 68, 69 of the segments through a common, closed-end feed line 66, for which purpose the feed line 66 is provided with openings 67 and forms part of the tip of each segment. The reaction chambers 68, 69 are filled with acidic methanol 70, 71 as the electrolyte. To ensure that the fuel mixture reliably enters the reaction chambers 68, 69, one pump 72, 73 for each fuel component is provided in a pump chamber 75. Whereas methanol enters the system from the outside through a pipe connection 74, the liquid phase 65, if water (but especially water from a separately constructed tank, e.g., in a chamber 76), can be fed to the combustion process from an internal source.

The pump chamber 75 is arranged at the opposite end from the pressure chamber 60, so that these two chambers 75, 60 enclose the housing 31 with its reaction chambers between them.

A control system 120 is provided in another chamber 77 and can adjust the ratios of the individual components of the fuel mixture, water and methanol in this case, in an optimum way by automatically controlling the pumps 72, 73.

The chambers 62, 75, 76, and 77 are placed one within the other in the manner of nested boxes and are tightened against the lower flange 33 of the housing 31 by means of an end plate 78 and, in the present case, four screws 79. The construction principle allows the addition of additional chambers or ventilators for cooling the electronics of the control system. If necessary, it is also possible to attach another fuel cell, but in this case it is necessary to provide sufficient spacing, so that air can enter the pressure chamber 60 through the opening 80 in the pressure chamber housing 81.

The fuel cell 30 is designed for operation with exclusively vertically rising capillary tubes and a pressure chamber 60 at the top. Since the acidic methanol 70, 71 does not fill the reaction chambers 68, 69 as far as the cover plate 54, a free space 82, 83 is left above the acid methanol 70, 71. Gaseous reaction products, in the form of $CO_2$ in the present case, collect in these free spaces 83, 84 and are discharged to the outside through an exhaust gas line 84 with openings 85.

As the sectional drawings according to FIGS. 9 and 10 also show, the exhaust gas line 84 continues the feed line 66 centrally between the adjacent tips of the segments, and the walls of the feed line 66 and of the exhaust gas line 84 constitute one of the boundaries of the reaction chambers 68, 69. However, no special sealing measures are necessary between the common separating walls 43, 44 and the feed line 66 and exhaust gas line 84.

In addition, level sensors 91, 92, and 92', which monitor the filling level of the methanol 70, 71 in the reaction chambers 68, 69, are provided to ensure reliable operation of the fuel cell 30. Since the separating walls 43, 44 are installed without a tight seal, it is sufficient to monitor the filling level of a single reaction chamber 68. It is thus guaranteed that free spaces 83, 84 are present above the acidic methanol 70, 71 and that the filling level is sufficiently high. If one limit or the other is exceeded, the combustion process of the fuel cell is stopped.

Figure 14:
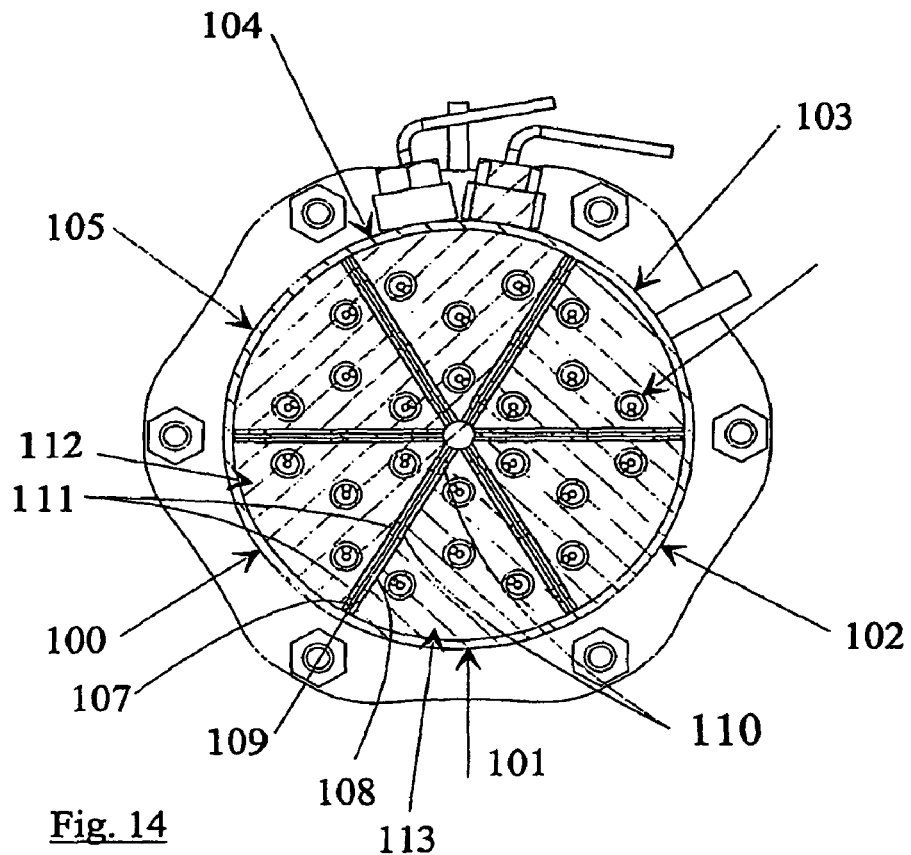
FIG. 14 shows a horizontal section through the sectors of another embodiment.

FIG. 14 shows a horizontal section of another embodiment of a fuel cell of the invention, which again has six sectors 100-105, each with bundles of capillary tubes 106. In contrast to the previously described embodiment, the sectors 100-105 are separated from each other by two separating walls, for example, the sectors 100 and 101 are separated from each other by the two parallel separating walls 107, 108. A free space 109, which is filled with an electrolyte, is left between the pairs of separating walls 107, 108. This free space 109 is accessible through opposing openings 110, 111 in the separating walls 107, 108, so that the reaction chambers 112, 113 of the two sectors 100, 101 also communicate with each other.

Figure 15:
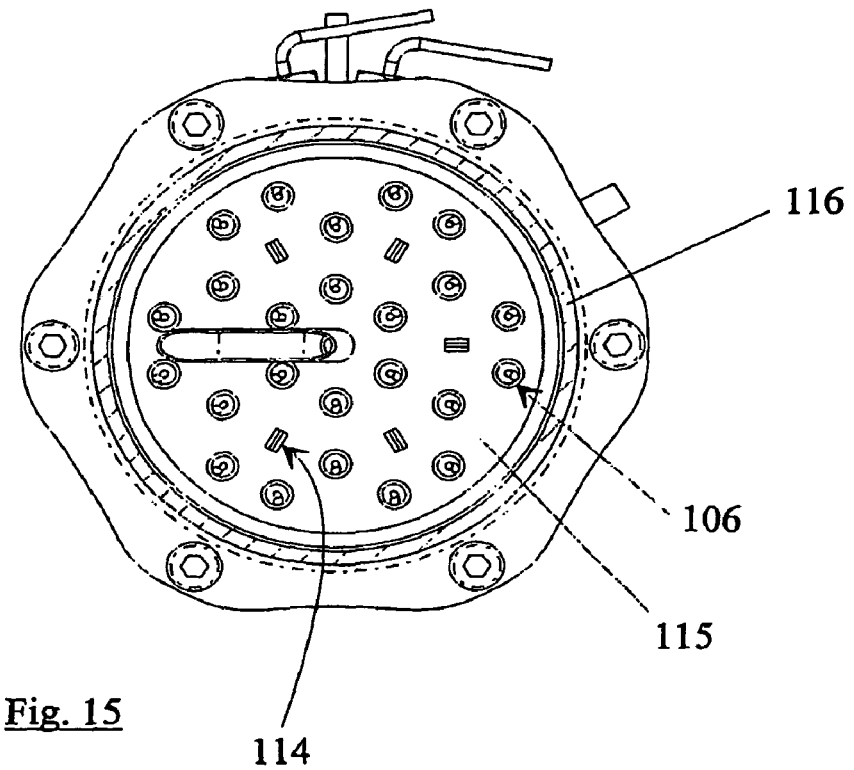
FIG. 15 shows another horizontal section through a pressure chamber of the last embodiment.

Each separating wall 107, 108 is provided with a counter-electrode of the type explained at the beginning. The free ends of capillary tubes 106 and connectors 114 of the separating walls 107, 108 penetrate and are held by cover plates 115. This is illustrated in FIG. 15, which shows a sectional drawing through a pressure chamber housing 116.

What is claimed is:

1. A fuel cell comprising:
   a reaction chamber;
   a plurality of capillary tubes configured to permit an oxidant to flow there through, the capillary tubes being arranged in bundles in adjacent segments within the reaction chamber;
   a plurality of electrodes, at least one of the plurality of electrodes passing through each of the plurality of capillary tubes, being against each of the plurality of capillary tubes, or passing through and being against each of the plurality of capillary tubes; and
   a plurality of counter-electrodes,
   wherein each electrode extends beyond ends of its respective capillary tube,
   wherein electrodes associated with capillary tubes of a segment are electrically connected to one another at each end at substantially the same electrical potential, and
   wherein each segment has a wall section to which is attached at least one of the counter-electrodes or wherein the wall section at least partially forms at least one of the counter-electrodes.

2. The fuel cell of claim 1, wherein the segments are circular segments.

3. The fuel cell of claim 1, wherein respective ones of the electrodes of a capillary tube of each segment are electrically connected to the respective counterelectrode of an adjacent segment.

4. The fuel cell of claim 1, wherein the electrodes are electrically connected to one another at their adjacent ends.

5. The fuel cell of claim 1, further comprising a switch and electrical connections that are capable of being preset by the switch.

6. The fuel cell of claim 1, wherein each segment has its own wall.

7. The fuel cell of claim 6, wherein two adjacent segments have wall sections which face each other and form two spaced separating walls.

8. The fuel cell of claim 1, wherein two adjacent segments share a common separating wall.

9. The fuel cell of claim 7, wherein the separating walls are constructed without a seal.

10. The fuel cell of claim 7, wherein each of the separating walls has a separately constructed one of the plural counterelectordes, which constitutes the counterelectrode of the respective segment.

11. The fuel cell of claim 8, wherein the common separating wall has one of the plural counterelectordes on each side.

12. The fuel cell of claim 11, wherein each of the plural counterelectrodes comprises a support sheet, and a lattice-shaped mount for a catalyst, the lattice-shaped mount covering the support sheet.

13. The fuel cell of claim 1, wherein each of the capillary tubes comprises a lattice-shaped core comprised of titanium, a catalyst surrounding the lattice-shaped core, and a membrane surrounding the catalyst.

14. The fuel cell of claim 12, wherein at least one of the support sheet and the lattice-shaped mount is comprised of titanium.

15. The fuel cell of claim 1, wherein ends of the capillary tubes are open so that a gas can flow through each of the capillary tubes.

16. The fuel cell of claim 15, further comprising a pressure chamber formed at one of the open ends of each of the capillary tubes, and a ventilator for admitting atmospheric air into the pressure chamber.

17. The fuel cell of claim 16, further comprising a common, closed-end feed line for the oxidant, the feed line extending between the segments and having openings through which the oxidant can flow into the reaction chamber.

18. The fuel cell of claim 1, further comprising an exhaust gas line extending from outside of the fuel cell and having openings through which a gaseous reaction product in the reaction chamber can flow into the exhaust gas line and out of the fuel cell.

19. The fuel cell of claim 17, further comprising an exhaust gas line extending from outside of the fuel cell and having openings through which a gaseous reaction product in the reaction chamber can flow into the exhaust gas line and out of the fuel cell.

20. The fuel cell of claim 19, wherein the exhaust gas line is a continuation of the feed line.

21. The fuel cell of claim 17, further comprising:
a pump chamber formed at the other of the open ends of each of the capillary tubes; and
a pump installed in the pump chamber and connected to the feed line.

22. The fuel cell of claim 21, further comprising:
pumps for pumping the respective individual components of the oxidant into the feed line; and
a control system for automatically controlling operation of the pumps to optimally adjust proportions of respective individual oxidants.

23. The fuel cell of claim 22, wherein the individual oxidants comprise water and methanol.

24. The fuel cell of claim 16, wherein the fuel cell is oriented that the capillary tubes are disposed vertically and the pressure chamber is disposed above the reaction chamber.

25. The fuel cell of claim 24, further comprising a collecting chamber for collecting a liquid phase emerging from the plural capillary tubes.

26. The fuel cell of claim 25, wherein the liquid phase is water, and further comprising a means for returning the water to the reaction chamber.

27. The fuel cell of claim 1, wherein the reaction chamber is filled with acidic methanol.

28. The fuel cell of claim 1, further comprising at least one level sensor for monitoring a filling level of the oxidant in the reaction chamber.

29. The fuel cell of claim 27, wherein a free space remains above the acidic methanol.

30. The fuel cell of claim 28, wherein the fuel cell is configured such that when the filling level is outside a range of levels, a reaction process occurring in the fuel cell is stopped.

31. The fuel cell of claim 1, further comprising:
a cylindrical housing having opposite first and second axial ends;
a first cover plate covering the first axial end; and
a second cover plate covering the second axial end,
wherein the segments are disposed inside the cylindrical housing with the ends of each of the capillary tubes extending through the first and second cover plates.

32. The fuel cell of claim 31, wherein each of the first and second cover plates are configured to grip the segments and hold the segments in place, each of the first and second cover plates further comprising panels in which ends of the capillary tubes are mounted.

33. The fuel cell of claim 32, further comprising connectors electrically connected to the counter-electrodes, and wherein the connectors extend through the first and second cover plates.

34. The fuel cell of claim 31, wherein the first and second cover plates have grooves on a side surface thereof, holding the segments in place.

* * * * *

UNITED STATES PATENT AND TRADEMARK OFFICE
CERTIFICATE OF CORRECTION

PATENT NO.         : 7,989,114 B2                                     Page 1 of 1
APPLICATION NO.    : 10/591209
DATED              : August 2, 2011
INVENTOR(S)        : Stephan Rüdiger Blum It is certified that error appears in the above-identified patent and that said Letters Patent is hereby corrected as shown below:

Add the following information to the cover page of the above-identified patent:

--(30) Foreign Application Priority Data

Mar. 03, 2004  (DE)          10 2004 010 995--

Signed and Sealed this
Twenty-fourth Day of July, 2012

David J. Kappos
*Director of the United States Patent and Trademark Office*